United States Patent
Perr et al.

(10) Patent No.: US 10,494,981 B2
(45) Date of Patent: Dec. 3, 2019

(54) COMBUSTION PRE-CHAMBER DEVICE FOR AN INTERNAL COMBUSTION ENGINE

(71) Applicant: Cummins Inc., Columbus, IN (US)

(72) Inventors: Andrew P. Perr, Columbus, IN (US); Philipe F. Saad, Columbus, IN (US); Akintomide K. Akinola, Whiteland, IN (US); Rick Vaughan Lewis, Jr., Franklin, IN (US); Dwight A. Doig, Columbus, IN (US)

(73) Assignee: Cummins Inc, Columbus, IN (US)

( * ) Notice: Subject to any disclaimer, the term of this patent is extended or adjusted under 35 U.S.C. 154(b) by 0 days.

(21) Appl. No.: 16/434,257

(22) Filed: Jun. 7, 2019

(65) Prior Publication Data
US 2019/0284985 A1    Sep. 19, 2019

Related U.S. Application Data

(63) Continuation of application No. PCT/US2017/065032, filed on Dec. 7, 2017.

(60) Provisional application No. 62/431,872, filed on Dec. 9, 2016.

(51) Int. Cl.
| | |
|---|---|
| *F01P 3/16* | (2006.01) |
| *F02B 19/12* | (2006.01) |
| *F02B 19/10* | (2006.01) |
| *F02P 13/00* | (2006.01) |
| *H01T 13/54* | (2006.01) |
| *F01P 3/02* | (2006.01) |
| *F02B 19/18* | (2006.01) |

(52) U.S. Cl.
CPC .............. *F01P 3/16* (2013.01); *F01P 3/02* (2013.01); *F02B 19/10* (2013.01); *F02B 19/1009* (2013.01); *F02B 19/12* (2013.01); *F02B 19/18* (2013.01); *F02P 13/00* (2013.01); *H01T 13/54* (2013.01); *F01P 2003/024* (2013.01)

(58) Field of Classification Search
CPC ........ F01P 3/16; F01P 3/12; F01P 3/02; F02P 13/00; H01T 13/54; F02B 19/10; F02B 19/1004; F02B 19/1009; F02B 19/16; F02B 19/165; F02B 19/18; F02B 19/12
See application file for complete search history.

(56) References Cited

U.S. PATENT DOCUMENTS

| | | |
|---|---|---|
| 2011/0005478 A1 | 1/2011 | Taliaferro |
| 2011/0146618 A1* | 6/2011 | LaPointe .............. F02B 19/12 123/266 |
| 2013/0206101 A1 | 8/2013 | Douglas et al. |

(Continued)

OTHER PUBLICATIONS

Search Report and Written Opinion, PCT Appln. No. PCT/US2017/065032, dated Feb. 9, 2018, 7 pgs.

*Primary Examiner* — Jacob M Amick
(74) *Attorney, Agent, or Firm* — Taft Stettinius & Hollister LLP

(57) ABSTRACT

A combustion pre-chamber device for a spark ignition internal combustion engine is configured to engage a spark plug and be mounted to a cylinder head in communication with a combustion chamber of a cylinder of the engine. The combustion pre-chamber device includes a number of bores that open at an outer surface thereof that extend into the body and receive a coolant flow to provide cooling for a combustion pre-chamber of the combustion pre-chamber device.

20 Claims, 8 Drawing Sheets

(56) References Cited

U.S. PATENT DOCUMENTS

2016/0333771 A1\* 11/2016 Willi .................. F02B 19/1004
2016/0348570 A1   12/2016 Willi \* cited by examiner

COMBUSTION PRE-CHAMBER DEVICE FOR AN INTERNAL COMBUSTION ENGINE

CROSS-REFERENCE TO RELATED APPLICATION

The present application is a continuation of International Patent Application No. PCT/US17/65032 filed on Dec. 7, 2017, which claims the benefit of the filing date of U.S. Provisional App. Ser. No. 62/431,872 filed on Dec. 9, 2016, each of which is incorporated herein by reference.

TECHNICAL FIELD

The present application relates to internal combustion engines, and more particularly, but not exclusively relates to a combustion pre-chamber device for spark ignition engines.

BACKGROUND

Combustion pre-chamber devices in spark ignition engines reduce engine emissions and can improve performance by reducing the timing delay and increasing the speed of heat release. However, currently available combustion pre-chamber devices suffer from issues relating to misfire events and lowered durability of ignition systems due to the high temperatures within the combustion pre-chamber devices. Accordingly, there is a continuing demand for further contributions in this area of technology.

SUMMARY

One embodiment of the present application is a combustion pre-chamber device for a spark ignition internal combustion engine. The pre-chamber device includes a number of bores that open at an outer surface thereof that extend into the body and receive a coolant flow to provide cooling for a combustion pre-chamber of the combustion pre-chamber device.

Other embodiments include unique methods, systems, devices, and apparatus involving or relating to spark ignition engine modifications and/or emissions control. Further objects, forms, embodiments, benefits, advantages, features, and aspects of the present application shall become apparent from the description and drawings contained herein.

DETAILED DESCRIPTION

For the purposes of promoting an understanding of the principles of the invention, reference will now be made to the embodiments illustrated in the figures and specific language will be used to describe the same. It will nevertheless be understood that no limitation of the scope of the invention is thereby intended, such alterations and further modifications in the illustrated embodiments, and such further applications of the principles of the invention as illustrated therein being contemplated as would normally occur to one skilled in the art to which the invention relates.

Figure 1:
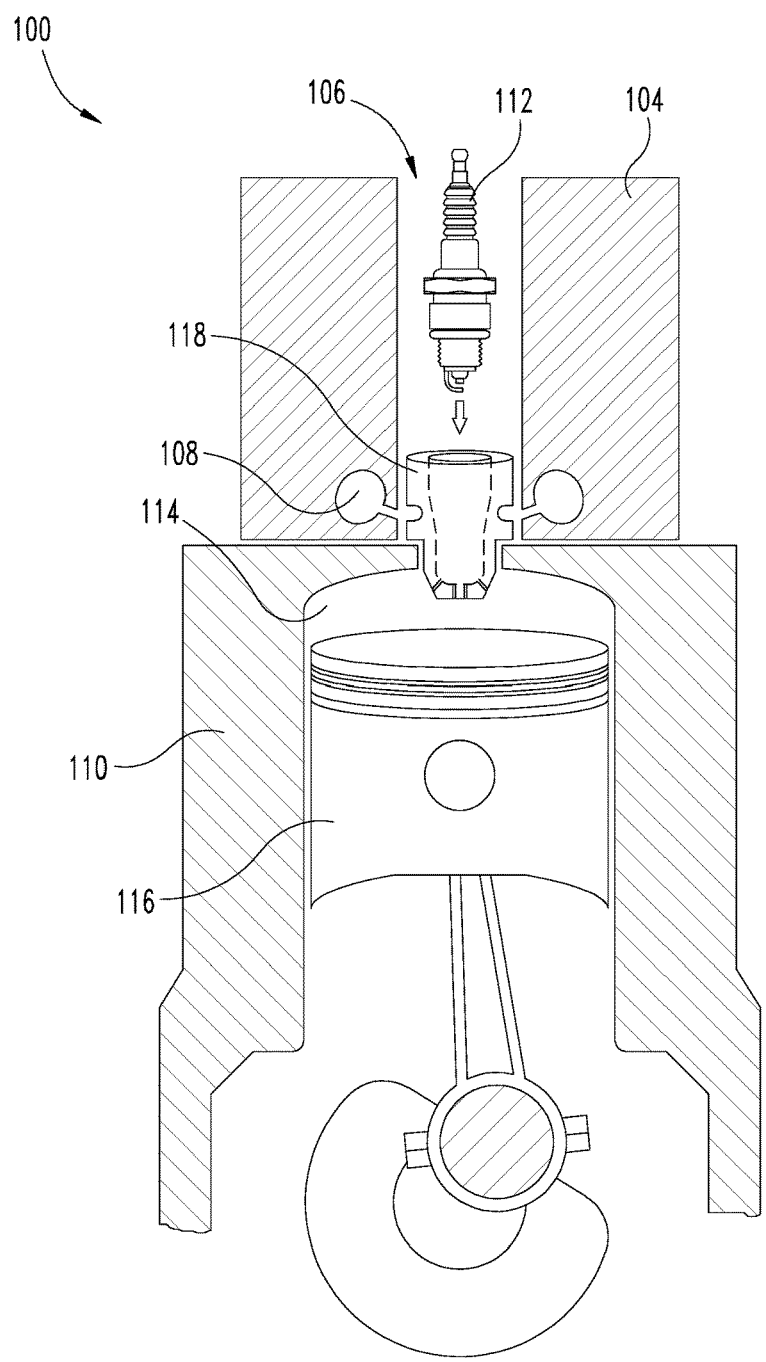
FIG. 1 is a schematic illustration of a cutaway view of an internal combustion engine including a combustion pre-chamber device according to one embodiment of the present disclosure.

FIG. 1 is a cutaway schematic illustration of an internal combustion engine 100 including a combustion pre-chamber device 118. The engine 100 includes a cylinder head 104 defining a spark plug passage 106 and a head cooling passage 108. The engine 100 further includes an engine block 110 that assembles with the cylinder head 104 to form combustion chamber 114 of the engine 100. A piston 116 is typically provided in combustion chamber 114. In certain embodiments, the engine 100 is fueled with gasoline, and/or natural gas and/or related hydrocarbons such as methane, ethane, or propane. In certain embodiments, the engine 100 is partially fueled with natural gas, and/or is a hybrid engine using natural gas in combination with other fuels.

The cylinder head 104 may include multiple spark plug passages 106 corresponding to each of a set of multiple cylinders in the engine block 110. The spark plug passage 106 receives a spark plug 112 that ordinarily exposes the spark plug electrode to the combustion chamber 114 defined by the engine block 110. A combustion pre-chamber device 118 is positioned in the spark plug passage 106 such that the spark plug electrode is not exposed directly to the combustion chamber 114. In certain embodiments, the combustion pre-chamber device 118 is a separate device that is coupled to the cylinder head 104. In certain other embodiments, the combustion pre-chamber device 118 is formed integrally with the cylinder head 104.

Figure 2:
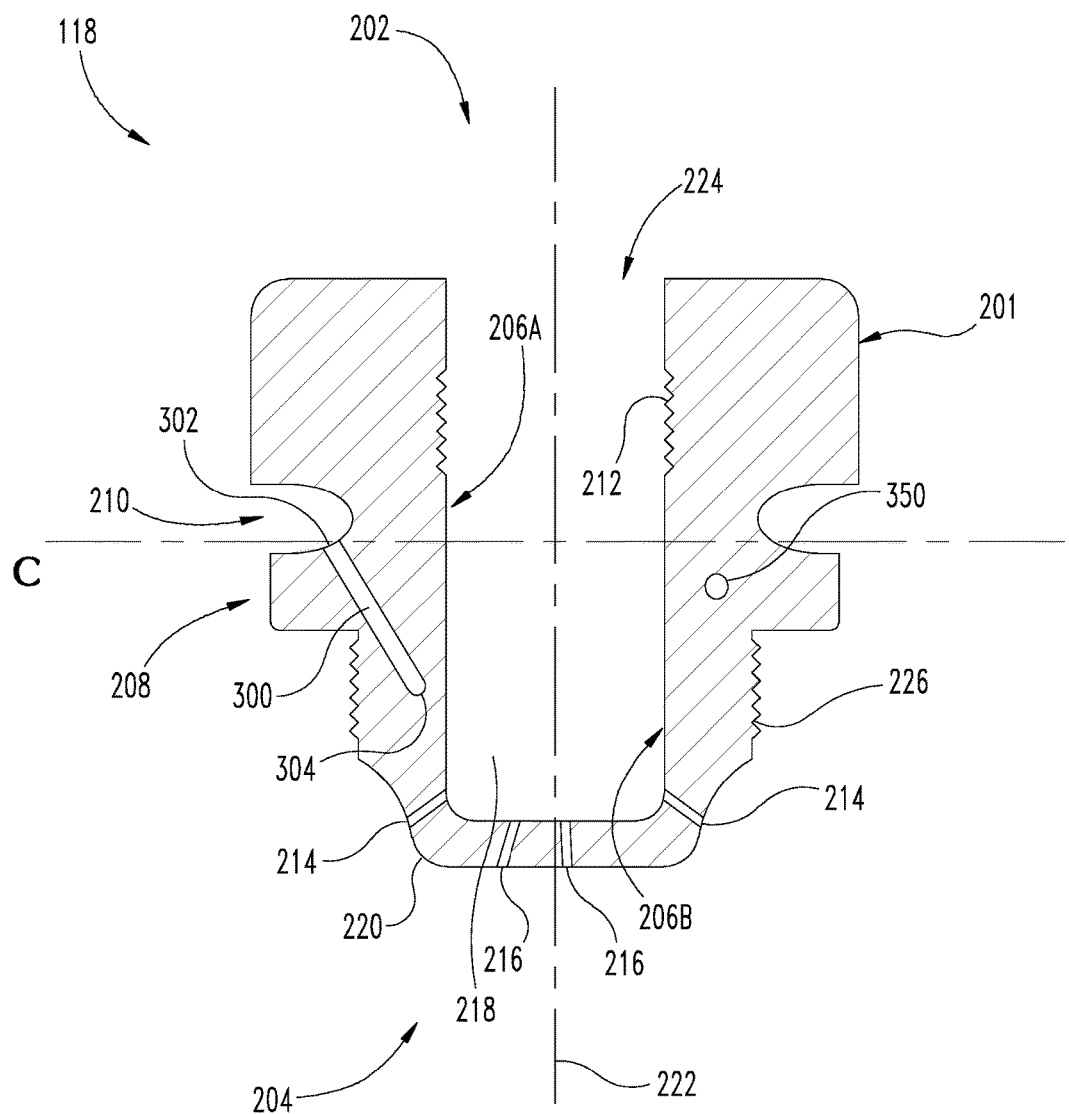
FIG. 2 is a schematic illustration of a cross-sectional view of the combustion pre-chamber device shown in FIG. 1.

Referring to FIG. 2, combustion pre-chamber device 118 is illustrated in isolation. The device 118 includes a body 201 that extends from a first (proximal) end 202 to a second (distal) end 204. In certain embodiments, the first end 202 and the second end 204 are formed independently and secured together to form body 201. In certain other embodiments, the first end 202 and the second end 204 are formed as a single unit to provide an integral body 201. The device 118 further includes an inner surface including a first inner surface portion 206a and a second inner surface portion 206b, and an outer surface 208. In certain embodiments, the outer surface 208 defines a cooling channel 210 about the outer surface 208 of device 118. The cooling channel 210 is fluidly coupled to the head cooling passage 108 in cylinder head 104. In certain embodiments, the cooling channel 210 is a channel defined by the outer surface 208 and cooperates with the spark plug passage 106 and the cylinder head 104 to define a cooling jacket around the body 201 of device 118.

The first end 202 of body 201 defines an inner spark plug passage 224 along the first inner surface 206A, the inner spark plug passage 224 defining threads 212 that receive complementary spark plug threads defined by spark plug 112. In certain embodiments, the inner surface 206a at the first end 202 of body 201 includes first end threads 212 that are threadingly engageable to the threads of spark plug 112. In certain embodiments, the second end 204 of body 201 opposite the first end 202 includes second end threads 226 along the outer surface 208 that couple to complementary threads on the cylinder head 104. In certain embodiments, the threads on the cylinder head 104 are the original threads intended for the spark plug 112. In certain embodiments, the threads on the cylinder head 104 are threads machined on the cylinder head 104 formed by tapping a larger hole in the cylinder head 104 such that the device 118 engages a larger diameter hole than originally placed in the cylinder head 104 for the spark plug 112. In certain embodiments, the cylinder head 104 may be formed with a larger diameter hole structured to receive a combustion pre-chamber device 118, and/or the cylinder head 104 may be formed integrally with a combustion pre-chamber device 118.

The second end 204 of body 201 includes a distal tip that is substantially enclosed with a distal end wall 220 that includes a fluid connection with the inner passage 224 at first end 202. Distal end wall 220 includes a plurality of through-holes 214, 216 for communication with the combustion chamber 114. Second end 204 defines a combustion pre-chamber 218. The combustion pre-chamber 218 is configured to fluidly communicate with an electrode of the spark plug 112 when the spark plug 112 is received at the first end 202. In certain embodiments, the spark plug 112 includes multiple ignition sites, or electrodes, that are in fluid communication with combustion pre-chamber 218.

While the device 118 is coupled to the cylinder head 104 and the cylinder head 104 is coupled to the engine block 110, the second end 204 extends into the cylinder combustion chamber 114. The distal end wall 220 of second end 204 is located in the cylinder combustion chamber 114 sufficiently such that the through-holes 214, 216 communicate with the cylinder combustion chamber 114 to receive the charge air and fuel without interfering with the piston 116.

In certain embodiments, the second end 204 includes a plurality of circumferential through-holes 214 that are positioned around distal end wall 220 at the circumference of the second end 204, but do not extend through distal end wall 220. The first through-holes 214 provide fluid coupling between the combustion pre-chamber 218 and the cylinder combustion chamber 114. In certain further embodiments, the second end 204 includes at least one tip through-hole 216 near a center of the distal end wall 220. The tip through-hole(s) 216 may be at the center of the distal end wall 220 or near the center of the distal end wall 220. In certain embodiments, the spark plug 112, the spark plug passage 106, and the combustion pre-chamber device 118 may share a common central longitudinal axis 222. The tip through-hole(s) 216 may be aligned with the central longitudinal axis 222, or may be aligned at an angle oblique to the central longitudinal axis 222. In certain embodiments, the tip through-hole(s) 216 are formed near a location on the distal end wall 220 that is expected to experience the highest temperatures, for example near the center of the combustion chamber 114. In certain embodiments, the distal end wall 220 includes at least two tip through-holes 216 defined along axes parallel to and near the central longitudinal axis 222.

At least one cylindrically-shaped, elongated bore 300 is formed within the body 201. An exemplary representation of cross-sectional view of a bore 300 is shown in FIG. 2. Bore 300 has an outer end opening 302 at outer surface 208 of the device 118. In the illustrated embodiment, outer end opening 302 is located in cooling channel 210. Bore 300 extends along a longitudinal axis from the outer end opening 302 to a blind or closed inner end 304 positioned within the material of the body 201 of the device 118. Bore 300 is representative of a plurality of bores formed within the body 201 of the device 118 that extend in a first direction and orientation relative to central longitudinal axis 222. For example, a view of a second bore 350 is depicted in FIG. 2. As can be understood from comparing positions of bore 300 and bore 350 as shown in the cross-sectional view in FIG. 2, the bores 300, 350 extend in a plurality of different directions within the body 201. The bores 300, 350 provide a heat transfer environment that reduces the temperature of the distal end wall 220 during combustion, which may prevent pre-spark detonation of fuel and may improve the reliability of the combustion pre-chamber device 118.

In an embodiment, each one of the bores 300 has an end opening 302 positioned at a point along the circumference of a circle C defining an outer boundary or perimeter of the body 201 at the position of the cooling channel 210. A dotted line C shown in FIG. 2 represents a position of a plane of such a circle in the illustrated embodiment. As indicated in the configuration shown in FIG. 2, the line C may be perpendicular to the central longitudinal axis 222 of the device 118, and accordingly may also represent a central horizontal axis C of the device 118, in certain embodiments. The longitudinal axes of at least some of the plurality of the respective bores, such as bores 300 and 350 represented in FIG. 2, extend at different angles with respect to the points on the circumference at which their respective open ends 302, 352 are positioned and central longitudinal axis 222. For example, bores 300 may extend radially from and intersect central longitudinal axis 222 and bores 350 may be offset from and tangentially oriented relative to central longitudinal axis 222 so as to not intersect central longitudinal axis 222.

Figure 3:
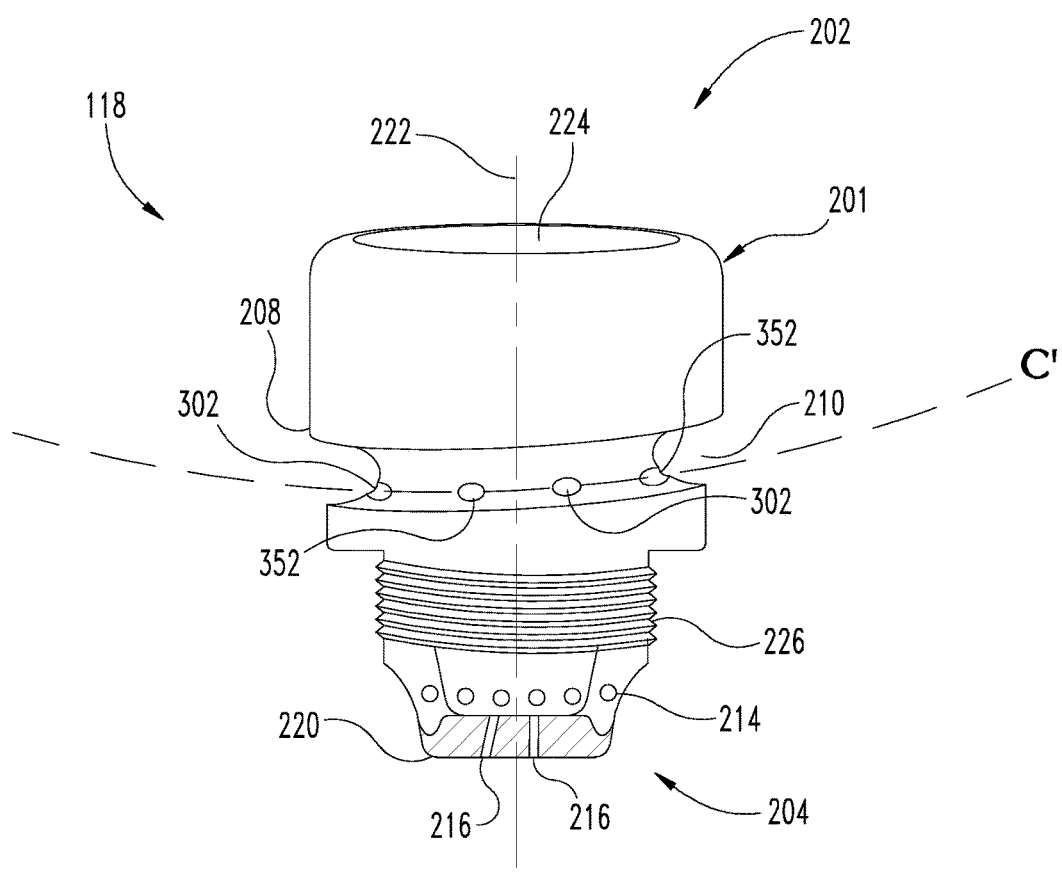
FIG. 3 is a schematic illustration of a side view of the combustion pre-chamber device of FIG. 1 with a partial cutaway at the tip area.

FIG. 3 is a schematic illustration of a side view of the combustion pre-chamber device 118 with a partial cutaway view of a distal tip area of the device. As shown in FIG. 3, the combustion pre-chamber device 118 has a plurality of bores 300, 350 as described above. Bores 300, 350 each include an end opening located on a circumference of a circular or near-circular shape defining the outer boundary of the body 201 at the position of the cooling channel 210. Around the circumference of the circle are a series of outer end openings 302, 352 of respective bores 300, 350. In another embodiment such as that shown in FIG. 3, a horizontal plane bisecting the ring-shaped cooling channel 210 need not be perpendicular to the central longitudinal axis 222 of the device 118. Dotted line C' as shown depicts such a non-perpendicular plane of the cooling channel 210.

Figure 4:
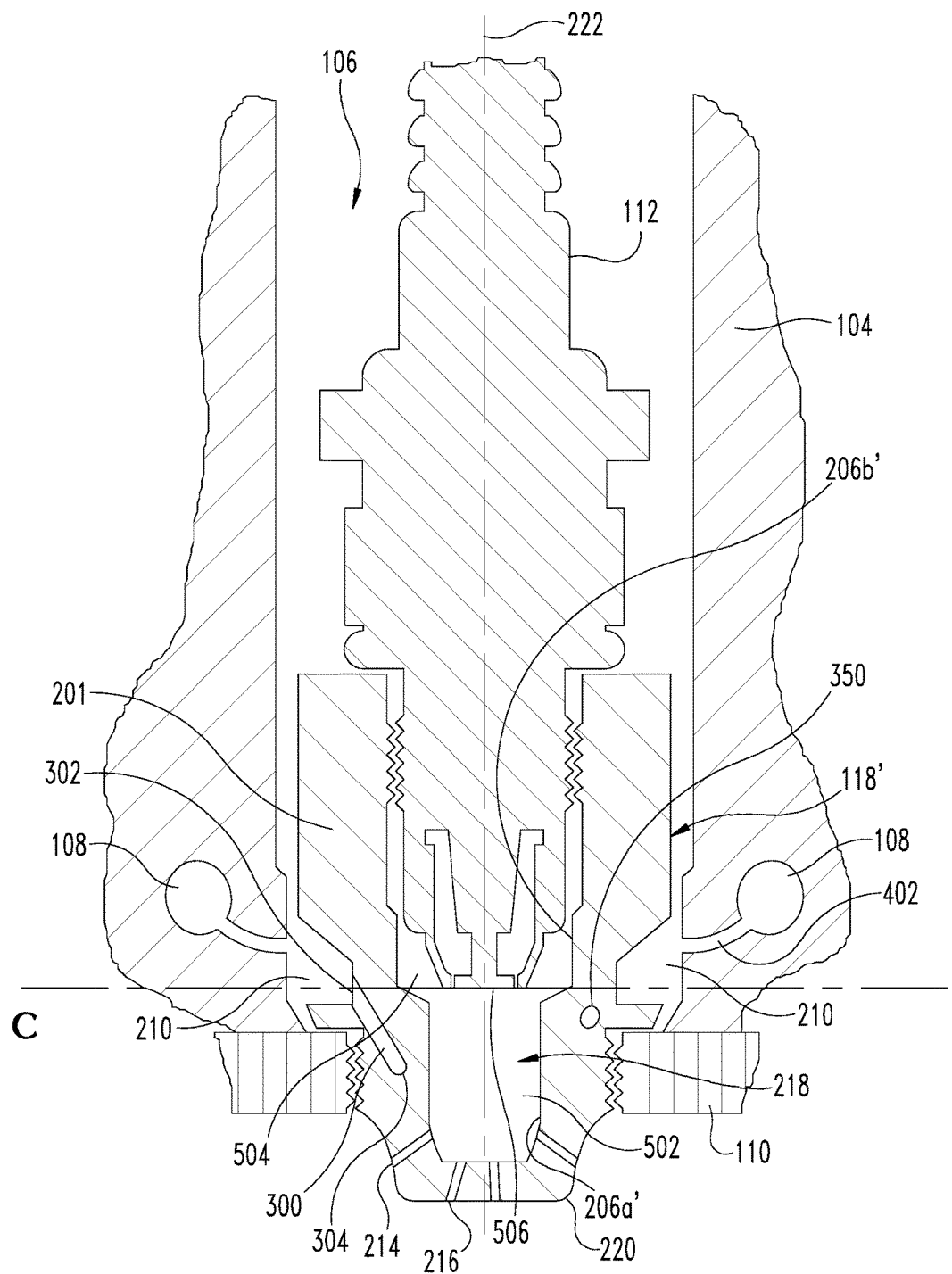
FIG. 4 is a schematic illustration of a cross-sectional view of a cylinder head with a spark plug and another embodiment combustion pre-chamber device having a primary volume and a secondary volume.

FIG. 4 is a schematic illustration of a cross-sectional view of spark plug 112 and another embodiment combustion pre-chamber device 118' installed in cylinder head 104. Device 118' is similar to device 118, but device 118' includes a combustion pre-chamber 218' that forms a primary volume 502 and a secondary volume 504. The device 118' includes bores 300 and 350 formed in the body 201 for receiving a fooling fluid as previously described with respect to device 118.

The cylinder head 104 includes spark plug channel 106 that may be fabricated or machined to receive the device 118, 118'. The cylinder head 104 also includes head cooling passage 108 fluidly coupled to an enlarged passageway (the spark plug channel 106), for example by a machined channel 402 between at least a portion of the head cooling passage 108 and the spark plug channel 106. In certain embodiments, the combustion pre-chamber device 118, 118' includes the cooling channel 210 defined by outer surface 208 that cooperates with the spark plug passage 106 and the cylinder head cooling passage 108 to define a cooling jacket around the second end 204 of device 118, 118'. A coolant fluid may be introduced into the cooling channel 210 from cooling passage 108.

As shown in FIG. 4, the device 118' receives the spark plug 112 in an installed position such that the electrode 506 of the spark plug 112 is positioned in the combustion pre-chamber 218'. The combustion pre-chamber 218' of the device 118' may be formed in a stepped cylindrical shape along its first and second inner surfaces 206a' and 206b', such that the combustion pre-chamber 218' has a primary volume 502 of a lesser radius than that of the secondary volume 504. Secondary volume 504 extends around electrode 506 and primary volume 504 is located distally of electrode 506 within the combustion pre-chamber 218' when the spark plug 112 is received in the inner spark plug passage 224 of device 218'. The spark plug 112 ignites an air-fuel mixture in the primary volume 502 of the combustion pre-chamber 218', and residual ignition gas (e.g. combustion products) flow into the secondary volume 504 of the combustion pre-chamber 218' and away from the electrode 506 of the spark plug 112. The secondary volume 504 clears residual gas and combustion byproducts from the spark plug gap at the electrode 506.

The spark plug 112 may be replaced periodically, for example on a maintenance schedule or as part of a repair operation. The combustion pre-chamber device 118, 118' may be replaced periodically, for example on a maintenance schedule or as part of a repair operation. In certain embodiments, the spark plug 112 is removed and replaced after a first period of time, and the combustion pre-chamber device 118, 118' is removed and replaced after a second period of time.

Also shown in FIG. 4 are examples of two bores 300, 350. Bore 350 is shown as a hole in the plane of the cross-section of body 201 of the device 118', because the longitudinal axis of the bore 350 is at a different angle and orientation than that of the longitudinal axis of bore 300 relative to the central longitudinal axis 222 of the device 118'. For example, bore 300 can be oblique to central longitudinal axis 222 and also extends in a proximal and distal direction toward central longitudinal axis 222 so that bore 300 is radially oriented and the extension of the longitudinal axis of bore 300 intersects central longitudinal axis 222. Bore 350 is tangentially oriented to central longitudinal axis 222 and more parallel or generally parallel to a plane that is orthogonal to central longitudinal axis 222.

Figure 5:
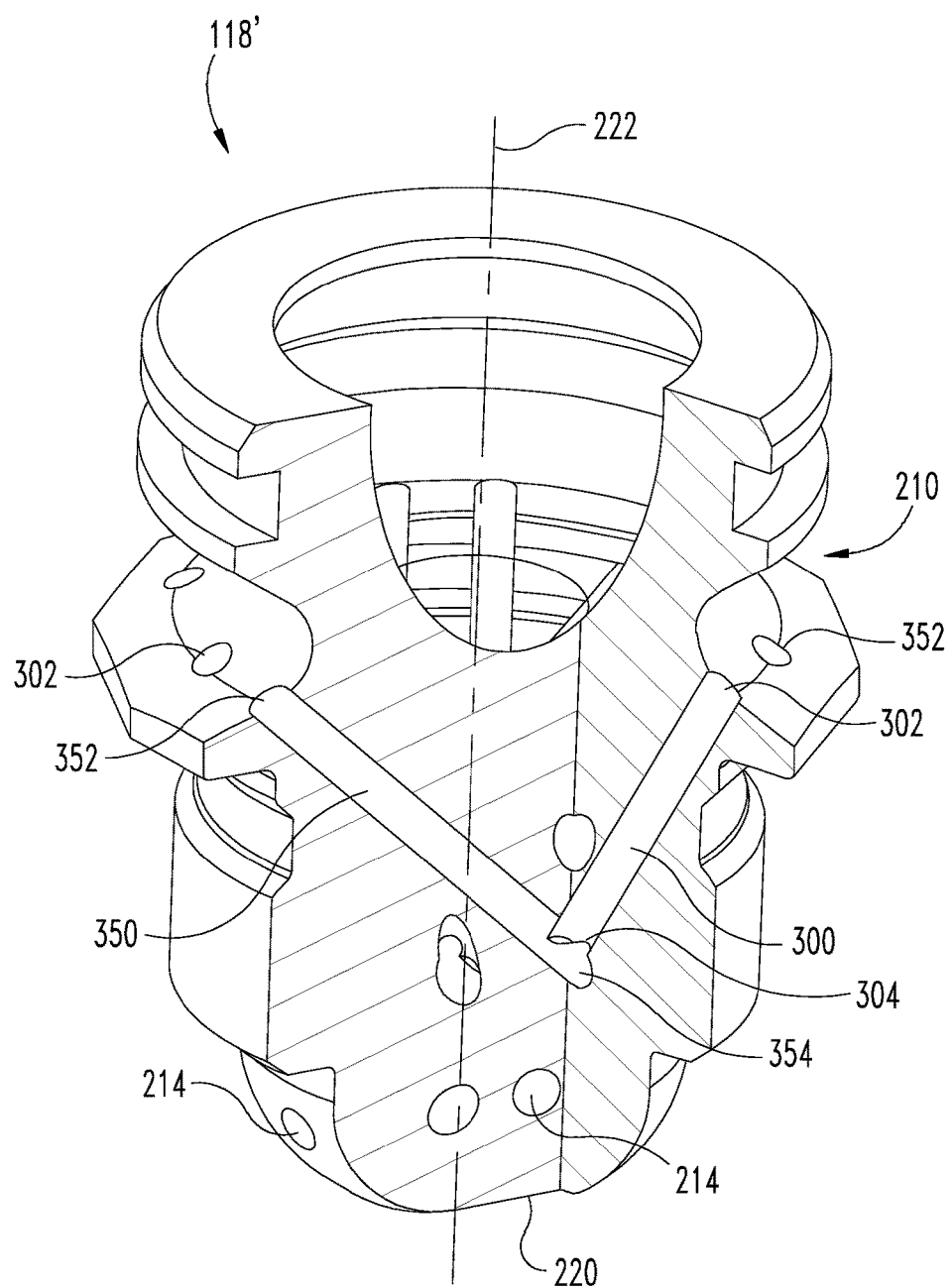
FIG. 5 is a schematic illustration with a partial cutaway of a perspective view of another embodiment combustion pre-chamber device.

FIG. 5 is a schematic illustration of a perspective view of the combustion pre-chamber device 118' with a partial cutaway of the view to show bores 300, 350 within the device 118'. In this view, exemplary bores 300, 350 are depicted along their respective longitudinal axes. The end openings 302 and 352 open at cooling channel 210. The cylindrically-shaped bore 350 extends along a longitudinal axis in a direction tangential to a circle around central longitudinal axis 222 to a closed end 354 of the bore 350 positioned distally closer to the distal end wall 220 of the device 118. Thus flow of coolant into the bore 350 from the cooling channel 210 is channeled toward the closed end 354 and accordingly toward the direction of the primary volume 502 defined within the pre-combustion chamber 218' of the device 118'. Similarly, a bore 300 has an open end 302 that is opened to and in fluid connection with cooling channel 210. Bore 300 extends radially from central longitudinal axis 222 and intersects bore 350 at or near closed end 314.

As may be appreciated from FIG. 5, the angles of the longitudinal axes of bores 300 and 350 differ with respect to central longitudinal axis 222 of the device 118, 118', so that the bores 300, 350 extend into different portions of the body 201. Hence different portions of the body 201 may receive the cooling effect of coolant flowing within the respective bores 300, 350. Also, bores 300 and 350 differ in bore length, i.e., the distance between their respective open ends 302 and 352 and closed ends 304 and 354. The differing bore lengths allow for different portions of the body 201 to receive the cooling effect of coolant flowing within the respective bores. Shorter bores interposed with longer bores provide cooling effect to a maximum volume of the material forming the body 201 of the device 118, 118'.

In an embodiment as depicted in FIGS. 4 and 5, the open ends 302, 352 of the bores 300, 350 are formed at respective points along the circumference of the circular plane defined at line C through cooling channel 210. In other embodiments, the open ends 302, 352 of the bores 300, 350 are not formed at cooling channel 210, but instead are formed at other points along the outer surface 208 between the first end 202 and the second end 204 of the body 201 of the device 118, 118'.

Figure 6:
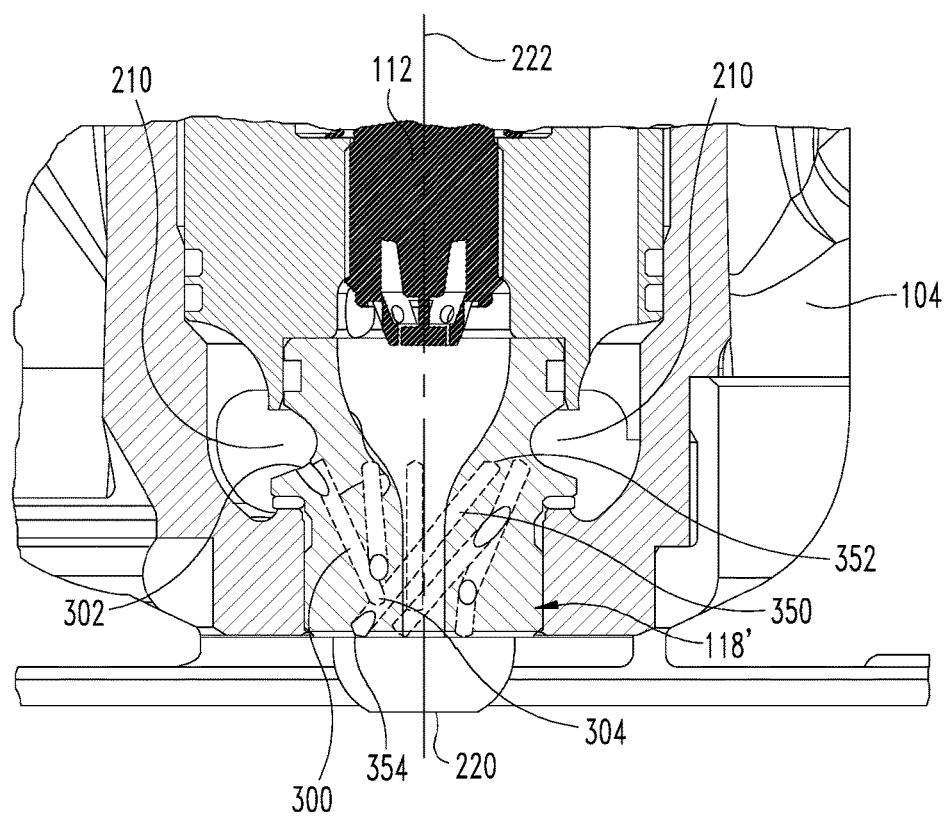
FIG. 6 is a schematic three-dimensional illustration with partial cutaways taken from a side of the combustion pre-chamber device of FIG. 5 engaged in a cylinder head.

FIG. 6 is a schematic illustration of a three-dimensional view with partial cutaways taken from a side of the combustion pre-chamber device 118, 118'. Device 118, 118' is secured in the cylinder head 104 so that distal end wall 220 is positioned in the combustion chamber 114 and cooling channel 210 is positioned to receive coolant flow. The coolant flow move through bores 300, 350 so that coolant flow is moved close to the distal end wall 220. The connected ones of the radial bores 300 and tangential bores 350 provide flow vectors so coolant flows in one of the bores 300, 350 and out of the connected one of the bores 350, 300. The coolant flow reduces temperatures of the combustion pre-chamber 218 which will reduce misfire events and extend the life of device 118, 118'.

Figure 7:
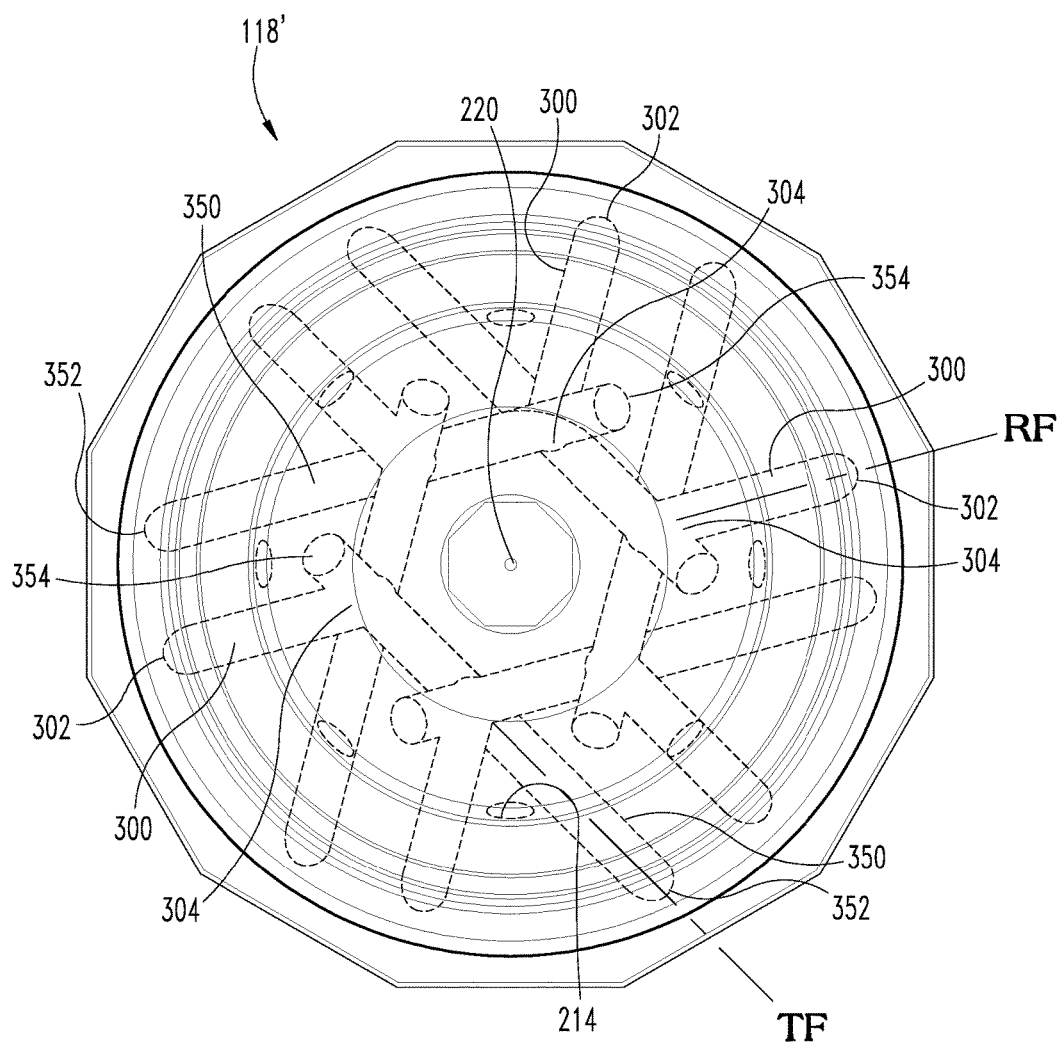
FIG. 7 is a schematic illustration of a three-dimensional view looking toward a second end (distal tip) of the combustion pre-chamber device of FIG. 5.

FIG. 7 is a schematic illustration of a three-dimensional view looking toward distal end wall 220 of the combustion pre-chamber device 118, 118'. FIG. 7 illustrates bores 300, 350 that intersect and have longitudinal axes extending in different radial and tangential directions from one another. For example, bore 300 is a radially extending bore and is configured with its longitudinal axis extending radially inwardly in a radial direction with respect to central longitudinal axis 222. Bore 350 is a tangentially extending bore and is configured with its longitudinal axis extending tangentially inwardly with respect to central longitudinal axis 222. The inward and outward movement of coolant occurs in the different radial and tangential directions afforded by the orientations of the differently oriented connected bores 300, 350. For example, coolant may move into and out of the depicted radial bores 300 marked with a dotted line RF along the direction of the dotted line RF (radial flow in/out). Coolant may move into and out of the depicted tangential bore 350 marked with a dotted line TF along the direction of the dotted line TF (tangential flow in/out). In the illustrated embodiment, there are provided six radial bores 300 connected to respective ones of six tangential bores 350, and the bores 300, 350 are provided in an alternating arrangement around coolant channel 210. Other numbers of bores 300, 350 and sequencing of bores 300, 350 around device 118, 118' are also contemplated.

Figure 8:
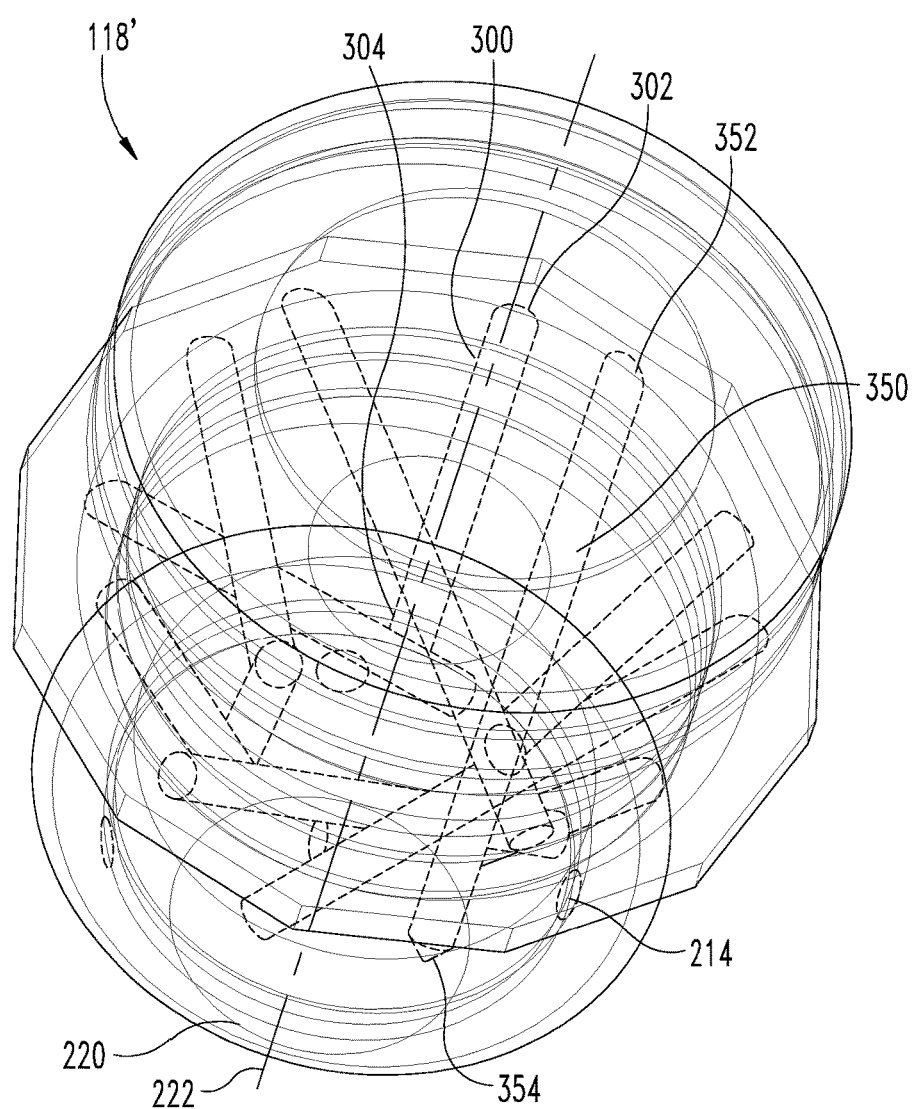
FIG. 8 is a schematic illustration of a three-dimensional view from a side of the combustion pre-chamber device of FIG. 5.

FIG. 8 is a schematic illustration of a three-dimensional perspective view taken from a side of the combustion pre-chamber device 118, 118'. Similarly to FIG. 7, FIG. 8 shows a plurality of bores 300, 350. Radial bores 300 having an outer opening end 302 and an inner closed end 304 are interposed between longer tangential bores 350. Radially extending bores 300 are interposed between tangentially extending bores 350. Tangentially extending bores 350 may extend in a plurality of tangential directions generally directed toward their closed ends 354 located closer to the primary volume 502 defined within the combustion pre-chamber 218 of the device 118'. It may be appreciated from FIG. 8 that interposed bores 300, 350 having differing lengths and differing angles and orientations with respect to the central longitudinal axis 222 of the device 118, 118' can be arranged to provide a maximum reach of cooling effect of the coolant present or flowing in or out of the bores 300, 350 without forming regular bore patterns that might create natural fracture lines in the body 201 of device 118, 118'.

It is contemplated that the number, types, orientations, diameter, and other features of the plurality of bores may differ in various embodiments. It is further contemplated that the bores can have open ends and/or closed ends that are positioned at a number of different points relative to the central longitudinal axis 222 between the first end 202 and the second end 204 of the device 118, 118'. The bores can also have differing angles compared to the central longitudinal axis 222 of the device 118. 118'. The bores 300, 350 are arranged to provide an effective reduction of combustion pre-chamber temperatures in different positions throughout the device 118, 118' without defining regular fracture lines.

As is evident from the figures and text presented above, a variety of embodiments according to the present invention are contemplated. For example, the bores 300, 350 may be drilled in the combustion pre-chamber device 118, 118' in one embodiment. In another embodiment, the combustion pre-chamber device 118, 118' is fabricated by three-dimensional printing to includes bores 300, 350 formed in body 201. Any other suitable technique for fabricating the combustion pre-chamber device 118, 118' is also contemplated.

According to one aspect of the present disclosure, an apparatus includes a combustion pre-chamber device for engaging a cylinder head of an internal combustion engine. The combustion pre-chamber device includes a body with an outer surface extending between a first end and an opposite second end of the body. The first end of the body includes an opening to an inner passage defined by the body for receiving a spark plug, and the second end of the body defines a combustion pre-chamber and at least one through-hole in communication with the combustion pre-chamber that opens at the outer surface. The body further includes at least one bore extending from an opening at the outer surface into the body to a closed end of the at least one bore that is located within the body of the combustion pre-chamber device.

In one embodiment, the second end of the body extends at least partially into a combustion chamber of a cylinder of the internal combustion engine with the body engaged to the cylinder head. The at least one through-hole fluidly couples the combustion pre-chamber with the combustion chamber of the cylinder.

In another embodiment, the combustion pre-chamber device defines a cooling channel in the outer surface and that at least one bore opens in the cooling channel. In a refinement of this embodiment, the at least one bore includes a plurality of bores that each open in the cooling channel. In a further refinement, the plurality of bores includes at least one radial bore that extends into the body along a longitudinal axis that intersects a central longitudinal axis of the body of the combustion pre-chamber device, the plurality of bores further including at least one tangential bore that extends into the body along a longitudinal axis that does not intersect the central longitudinal axis. In yet a further refinement, the radial bore intersects the tangential bore.

In another embodiment, the at least one bore includes at least one radially extending bore extending to a first closed end and at least one tangentially extending bore extending to a second closed end. In a refinement of this embodiment, the radially extending bore and the tangentially extending bore intersect one another at or adjacent the first and second closed ends. In a further refinement, the at least one radially extending bore includes a plurality of radially extending bores and the at least one tangentially extending bore includes a plurality of tangentially extending bores that intersect respective ones of the plurality of radially extending bores. In a further refinement, the combustion pre-chamber device defines a cooling channel in the outer surface and each of the plurality of radially extending bores and each of the plurality of tangentially extending bores open in the cooling channel. In yet a further refinement, each of the plurality of radially extending bores and each of the plurality of tangentially extending bores extend distally from respective opening in the cooling channel into the body toward a distal end wall of the body. In still a further refinement, the plurality of through-holes includes at least one tip through-hole that extends through the distal end wall and at least one circumferential through-hole that is proximal of the distal end wall.

According to another aspect of the present disclosure, a body includes a first end defining an inner passage along a first inner surface of the body at the first end, and the inner passage includes threads operable to receive a plurality of complementary spark plug threads defined by a spark plug. The body also includes a second end opposite the first end positionable into a combustion chamber of a cylinder. The second end defines a combustion pre-chamber along a second inner surface of the body and a plurality of second end threads along an outer surface of the second end operable to couple to a plurality of complementary cylinder head threads defined by the cylinder head. The second end includes at least one through-hole operable to fluidly couple the combustion pre-chamber and the combustion chamber of the cylinder. The body also includes at least one first bore and at least one second bore that intersects the at least one first bore. The at least one first and second bores each extend into the body from an opening at the outer surface to a blind end thereof that is located within the body.

In one embodiment, the at least one first bore extends radially into the body toward a central longitudinal axis of the body and the at least one second bore extends tangentially relative to the central longitudinal axis into the body. In a refinement of this embodiment, the at least one first bore includes a plurality of radially extending bore and the at least one second bore includes a plurality of tangentially extending bores that intersect respective ones of the plurality of radially extending bores.

In another embodiment, the body defines a cooling channel in the outer surface. The opening of each of the at least one first bore and the at least one second bore is in the cooling channel.

According to another aspect of the present disclosure, a system includes an internal combustion engine that has a cylinder defining a combustion chamber and a cylinder head engaged to the internal combustion engine. The cylinder head including a spark plug passage and a head cooling passage. The system further includes a combustion pre-chamber device positioned in the spark plug passage and coupled to the cylinder head. The combustion pre-chamber device including a first end and a second end and has an inner surface and an outer surface. The inner surface defines a combustion pre-chamber in fluid communication with the combustion chamber. The outer surface defines a cooling channel about the combustion pre-chamber device for receiving a coolant flow from the head cooling passage. The combustion pre-chamber device further includes at least one bore opening at the cooling channel. The at least one bore extends to a blind end location within the combustion pre-chamber device, and the at least one bore receives the coolant flow to provide cooling of the combustion pre-chamber.

In one embodiment, the at least one bore includes a first radially extending bore and a second tangentially extending bore that intersects the first radially extending bore, the coolant flowing through the first and second bores. In a refinement of this embodiment, a spark plug is provided that is engaged in the combustion pre-chamber device. The spark plug includes at least one electrode in fluid communication with the combustion pre-chamber. In another refinement, the second end of the combustion pre-chamber device includes a distal end wall in the combustion chamber and at least one through-hole that extends through the distal end wall.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus, comprising:
a combustion pre-chamber device for engaging a cylinder head of an internal combustion engine, the combustion pre-chamber device including a body with an outer surface extending between a first end and an opposite second end of the body, the first end of the body including an opening to an inner passage defined by the body for receiving a spark plug, the second end of the body defining a combustion pre-chamber and at least one through-hole in communication with the combustion pre-chamber that opens at the outer surface, the body further including at least one bore extending from an opening at the outer surface into the body to a closed end of the at least one bore that is located within the body of the combustion pre-chamber device.

2. The apparatus of claim 1, wherein the second end of the body extends at least partially into a combustion chamber of a cylinder of the internal combustion engine with the body engaged to the cylinder head, wherein the plurality of through-holes fluidly couple the combustion pre-chamber with the combustion chamber of the cylinder.

3. The apparatus of claim 1, wherein the combustion pre-chamber device defines a cooling channel in the outer surface and that at least one bore opens in the cooling channel.

4. The apparatus of claim 3, wherein the at least one bore includes a plurality of bores that each open in the cooling channel.

5. The apparatus of claim 4, wherein the plurality of bores includes at least one radial bore that extends into the body along a longitudinal axis that intersects a central longitudinal axis of the body of the combustion pre-chamber device, the plurality of bores further including at least one tangential bore that extends into the body along a longitudinal axis that does not intersect the central longitudinal axis.

6. The apparatus of claim 5, wherein the radial bore intersects the tangential bore.

7. The apparatus of claim 1, wherein the at least one bore includes at least one radially extending bore extending to a first closed end and at least one tangentially extending bore extending to a second closed end.

8. The apparatus of claim 7, wherein the radially extending bore and the tangentially extending bore intersect one another at or adjacent the first and second closed ends.

9. The apparatus of claim 8, wherein the at least one radially extending bore includes a plurality of radially extending bores and the at least one tangentially extending bore includes a plurality of tangentially extending bores that intersect respective ones of the plurality of radially extending bores.

10. The apparatus of claim 9, wherein the combustion pre-chamber device defines a cooling channel in the outer surface and each of the plurality of radially extending bores and each of the plurality of tangentially extending bores open in the cooling channel.

11. The apparatus of claim 10, wherein each of the plurality of radially extending bores and each of the plurality of tangentially extending bores extend distally from respective opening in the cooling channel into the body toward a distal end wall of the body.

12. The apparatus of claim 11, wherein the plurality of through-holes includes at least one tip through-hole that extends through the distal end wall and at least one circumferential through-hole that is proximal of the distal end wall.

13. An apparatus, comprising:
a body including a first end defining an inner passage along a first inner surface of the body at the first end, the inner passage including threads operable to receive a plurality of complementary spark plug threads defined by a spark plug; and
the body including a second end opposite the first end positionable into a combustion chamber of a cylinder, the second end defining a combustion pre-chamber along a second inner surface of the body and a plurality of second end threads along an outer surface of the second end operable to couple to a plurality of complementary cylinder head threads defined by the cylinder head, wherein the second end includes at least one through-hole operable to fluidly couple the combustion pre-chamber and the combustion chamber of the cylinder, and the body includes at least one first bore and at least one second bore that intersects the at least one first bore, the at least one first and second bores each extend into the body from an opening at the outer surface to a blind end thereof that is located within the body.

14. The apparatus of claim 13, wherein the at least one first bore extends radially into the body toward a central longitudinal axis of the body and the at least one second bore extends tangentially relative to the central longitudinal axis into the body.

15. The apparatus of claim 14, wherein the at least one first bore includes a plurality of radially extending bore and the at least one second bore includes a plurality of tangentially extending bores that intersect respective ones of the plurality of radially extending bores.

16. The apparatus of claim 13, wherein the body defines a cooling channel in the outer surface and the opening of each of the at least one first bore and the at least one second bore is in the cooling channel.

17. A system comprising:
  an internal combustion engine including a cylinder defining a combustion chamber;
  a cylinder head engaged to the internal combustion engine, the cylinder head including a spark plug passage and a head cooling passage; and
  a combustion pre-chamber device positioned in the spark plug passage and coupled to the cylinder head, the combustion pre-chamber device including a first end and a second end and having an inner surface and an outer surface, the inner surface defining a combustion pre-chamber in fluid communication with the combustion chamber, the outer surface defining a cooling channel about the combustion pre-chamber device for receiving a coolant flow from the head cooling passage, the combustion pre-chamber device further including at least one bore opening at the cooling channel, the at least one bore extending to a blind end location within the combustion pre-chamber device, the at least one bore receiving the coolant flow to provide cooling of the combustion pre-chamber.

18. The system of claim 17, wherein the at least one bore includes a first radially extending bore and a second tangentially extending bore that intersects the first radially extending bore, the coolant flowing through the first and second bores.

19. The system of claim 18, further comprising a spark plug engaged in the combustion pre-chamber device, the spark plug including at least one electrode in fluid communication with the combustion pre-chamber.

20. The system of claim 18, wherein the second end of the combustion pre-chamber device includes a distal end wall in the combustion chamber and at least one through-hole that extends through the distal end wall.

* * * * *